United States Patent [19]

Matthias et al.

[11] 4,149,808

[45] Apr. 17, 1979

[54] LINEAR DRIVE FOR A PRINTING APPARATUS

[75] Inventors: Dan W. Matthias, Downingtown, Pa.; Richard D. Thornton, Concord, Mass.

[73] Assignee: Exxon Research & Engineering Co., Florham Park, N.J.

[21] Appl. No.: 833,271

[22] Filed: Sep. 14, 1977

[51] Int. Cl.² .................. B41J 19/30; B41J 9/04; H04L 17/30
[52] U.S. Cl. .................. 400/144.2; 400/322; 310/12; 318/135
[58] Field of Search .............. 400/144, 144.1, 144.2, 400/144.3, 317, 142, 322; 310/12, 13, 14; 318/135, 119; 101/93.15, 93.16, 93.17

[56] References Cited

U.S. PATENT DOCUMENTS

| | | | |
|---|---|---|---|
| 3,090,880 | 5/1963 | Raymond | 310/268 |
| 3,162,796 | 12/1964 | Schreiber et al. | 318/135 |
| 3,292,065 | 12/1966 | Fredrickson | 318/135 |
| 3,509,981 | 5/1970 | Hylan et al. | 400/322 |
| 3,651,916 | 3/1972 | Becchi | 400/144.3 |
| 3,696,204 | 10/1972 | Wallsuog | 310/13 |
| 3,707,214 | 12/1972 | Punzano | 400/144.2 |
| 3,761,755 | 9/1973 | Iwaba et al. | 310/268 |
| 3,784,850 | 1/1974 | Iwaba et al. | 310/268 X |
| 3,817,367 | 6/1974 | Tramposch et al. | 400/144.2 |
| 3,842,960 | 10/1974 | Gerry | 400/142 |
| 3,864,588 | 2/1975 | Iwaba | 310/49 X |
| 3,867,676 | 2/1975 | Chai et al. | 318/135 |
| 3,904,897 | 9/1975 | Shichida et al. | 310/12 |
| 3,949,853 | 4/1976 | Lahr et al. | 400/174 |
| 4,012,676 | 3/1977 | Giebler | 400/322 X |
| 4,030,591 | 6/1977 | Martin et al. | 400/144.2 |
| 4,044,881 | 8/1977 | Chai et al. | 400/322 X |
| 4,072,101 | 2/1978 | Garcia et al. | 101/93.15 |

FOREIGN PATENT DOCUMENTS

2341754 2/1974 Fed. Rep. of Germany .......... 400/322

OTHER PUBLICATIONS

"Characteristics of a Synchronous Inductor Motor" Snowdon, 3/62, Trans. AIEE, vol. 8, pp. 1-5.
"Self-Oscillating Induction Motor for Shuttle Propulsion" Laithwaite, Proc. IEE. vol. 104, Part A, No. 14, Apr. 1957.
"Linear Induction Motors", Laithwaite, IEE, Paper No. 2433U, 12/57, pp. 461-466.
"Character Wheel for Low Cost Changeable Font Printer", C. A. Branson et al., IBM Tech. Discl. Bulletin, vol. 16, No. 5, 10/73.

*Primary Examiner*—E. H. Eickholt
*Attorney, Agent, or Firm*—N. L. Norris

[57] ABSTRACT

A serial impact printing element is mounted on the slider of a high performance linear stepper motor. The slider moves through the stator-to-stator air gap of the linear motor stator comprising an active stator portion having windings associated therewith and a passive stator portion without windings. In order to achieve high performance of the motor, the slider is relatively short as compared with the stator, and longitudinal flux leakage through and the weight of the slider are minimized by the use of nonmagnetic discontinuities therein. The impact printing element includes a wheel having a plurality of circumferentially spaced character elements which are rotated to the printing position by means of a rotary stepper motor. Since there are no windings on the passive portion of the stator, the character elements of the wheel are able to pass in close proximity to the passive portion thereby allowing the center of gravity of the rotary motor to be low so as to achieve stability of the impact printing element during high speed operation.

24 Claims, 7 Drawing Figures

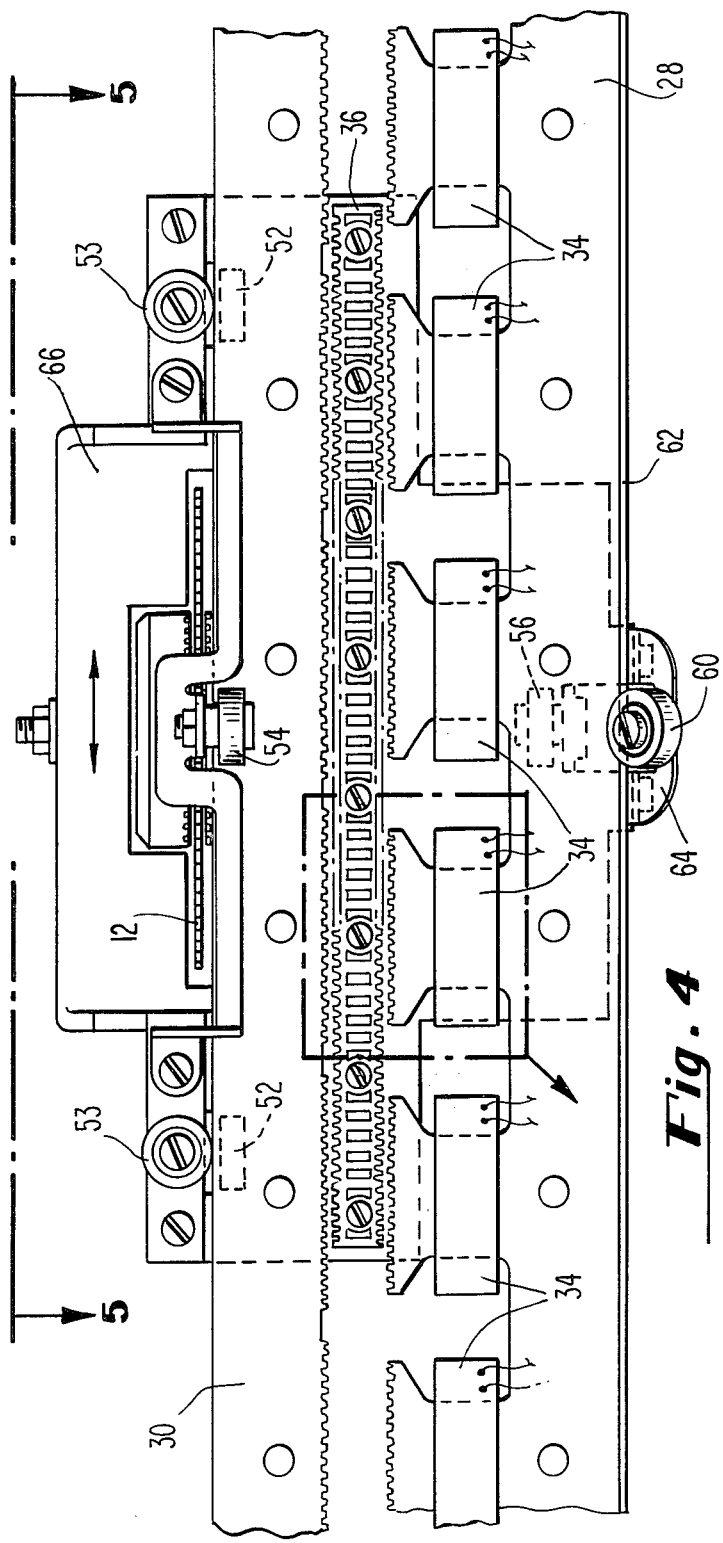
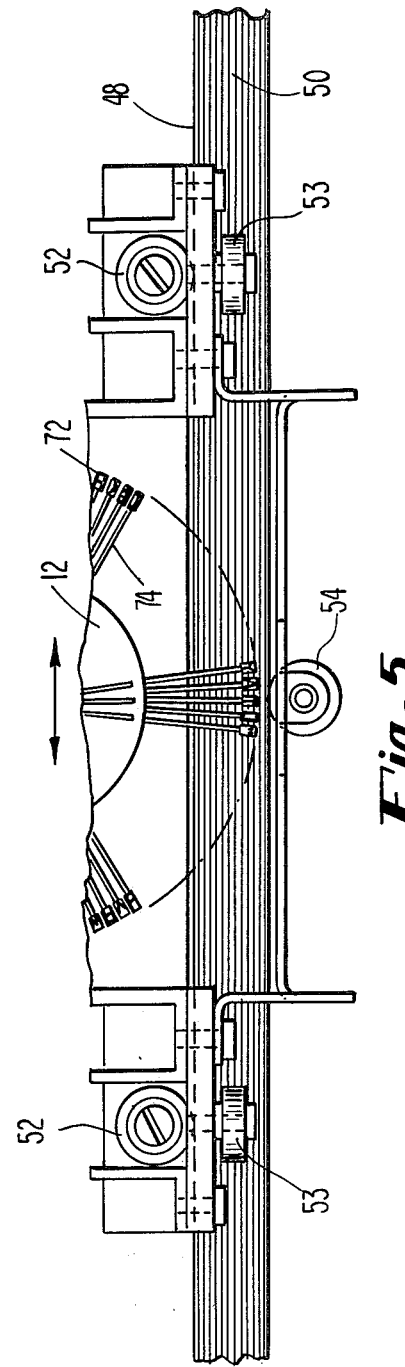
Fig. 4
Fig. 5

LINEAR DRIVE FOR A PRINTING APPARATUS

BACKGROUND OF THE INVENTION

This invention relates to two high performance printers of the type which may be utilized, for example, in connection with memory typewriters.

Printers of the serial impact type have heretofore utilized variable reluctance linear stepper motors. For example, Chai U.S. Pat. No. 3,867,676 discloses a variable reluctance linear stepper motor of the linear type which is intended for use in a printer application. Typically, such linear stepper motors are characterized by an undesirably low force-to-mass ratio. This low force-to-mass ratio may be the result of one of a number of factors.

One such factor is the overall weight or mass of the moving member itself. For example, the embodiment of FIG. 1 of Chai shows a substantial amount of magnetic material in the passive magnetic member 1 which substantially contributes to the overall mass of the moving member. Where the member 1 functions as a moving slider, the force-to-mass ratio is undesirably low. The same is true with respect to Fredrickson U.S. Pat. No. 3,292,065. In this regard, it will be noted that both the Chai and Fredrickson passive members have substantially greater length than the active stators. As a result, the large portion of the mass of the passive member which extends beyond the stator is of no consequence in generating usable force. Further, the passive members of both Fredrickson and Chai are relatively thick in cross-section even between the teeth or discontinuities in the passive members. Accordingly, a rather unlimited longitudinal flux path through the magnetic material of the passive member may be established for flux leakage which reduces the force-to-mass ratio for the slider of the motor. Apparently, neither Fredrickson nor Chai are at all concerned with maximizing the force-to-mass ratio by minimizing flux leakage. In this connection, it is noted that the motor of FIG. 9 of Chai which achieves the minimum longitudinal flux leakage as the result of discontinuities between the teeth of the slider which extend perpendicular or transverse to the direction of movement of the slider is not characterized by an optimized force-to-mass ratio. Rather, the force-to-mass ratio is a result of the single tooth per stator pole as well as a slider which always includes a substantial portion which extends beyond the stator structure and thereby produces no force.

Schreiber et al U.S. Pat. No. 3,162,796 also discloses a variable reluctance stepper motor of the linear type but demonstrates no interest in achieving a high force-to-mass ratio. In all of the Schreiber et al embodiments, there is a single tooth per stator pole and the slider extends beyond the stator structure so as to produce a small force-to-mass ratio. In almost all of the Schreiber et al embodiments, there is no stator structure on the interior of the cylindrical slider, and the minimum thickness of the slider is almost as great as the maximum thickness so as to permit the return of the flux longitudinally through the slider which necessarily reduces the force-to-mass ratio. The emdodiment of FIGS. 14 and 15 does disclose the use of an interior stator structure which permits a "reduction in weight" of the slider although there is no suggestion that the force-to-mass ratio is increased and the shape of the teeth which preclude any effective generation of force by the exterior stator structure in FIG. 14 and the interior stator structure of FIG. 14 suggests a low force-to-mass ratio. In connection with FIG. 15, there is the suggestion that the portion of the slider between the teeth may even comprise a non-magnetizable material. However, there is no suggestion that the non-magnetizable material is chosen for purposes of limiting longitudinal flux leakage and the suggestion that the material be "austen boron steel" precludes a further reduction in the force-to-mass ratio.

An article entitled *Characteristics of a Synchronous Inductor Motor*, Snowdon and Madsen, Trans. AIEE (applications in industry) Vol. 8, pp. 1–5, March, 1962, discloses a stepper motor having a rotor which is confined to the air gap of the stator. However, the force-to-mass ratio is relatively small since the rotor acts as a longitudinal flux return path to a single-sided stator. In order to provide this longitudinal flux return path, the minimum thickness of the rotor between the teeth of the rotor is substantial relative to the maximum thickness of the rotor at the teeth. An article entitled *A Self-Oscillating Induction Motor for Shuttle Propulsion*, Laithwaite and Lawrenson, Proc. IEE, Vol. 104, Part A, No. 14, April 1957, suggests that the rotor of Snowdon and Madsen might be unwound. However, the resulting slider would still have to provide a longitudinal flux return path for a single-sided stator. Therefore, even if the slider were shortened as disclosed in an article entitled *Linear Induction Motors*, Laithwaite, IEE, Paper No. 2433U, December 1957, the slider would still have a relatively low force-to-mass ratio and while this force-to-mass ratio might be increased by utilizing the double-sided stator disclosed in *Linear Induction Motors*, the configuration of the slider with its longitudinal flux leakage still severely limits the force-to-mass ratio.

Where the magnetic structure of the linear stepper motor results in a low force-to-mass ratio as described in the foregoing, the necessary force for high performance printing applications can only be achieved by driving the motor harder and this imposes requirements for larger power supplies. Where space, cost and heat are limiting factors in such printers, increased requirements for power supplies are undesirable.

In addition to the above-mentioned limitations on using linear stepper motors in high performance printing applications, there are also certain geometrical aspects which have heretofore created difficulties. In stepper motors which maximize the force-to-mass ratio by utilizing a stator which is energized by windings on both sides of a stator-to-stator air gap, certain difficulties are encountered in mounting the load on a slider which moves through the air gap. For example, where the print applying mechanism comprises a serial impact printing element such as a print wheel including circumferentially disposed character elements driven by a rotary motor, the print applying mechanism extends substantially above the slider and stator so as to result in an undesirably high center of gravity.

SUMMARY OF THE INVENTION

It is an object of this invention to provide an improved printing apparatus incorporating a linear stepper motor.

It is a more specific object of this invention to provide a high performance printing apparatus utilizing a linear stepper motor.

In accordance with these and other objects of the invention, a preferred embodiment of the invention comprises printing means including means for supporting a print receiving medium and means for applying print to the print receiving medium. Drive means creating relative movement between the printing means and the print receiving medium comprises a linear stepper motor including stator means having a plurality of pole positions. Each of the pole positions includes a plurality of magnetic stator elements on opposite sides of an air gap with non-magnetic material located in the spaces between the extremities of the magnetic stator elements on each of the opposite sides of the air gap. Winding means associated with the stator means generates magnetic flux paths transverse to the air gap when the winding means are energized. The drive means further comprises slider means located in the air gap for moving through the air gap and printing means are coupled to the slider for creating the relative movement between the means for supporting the print receiving medium and means for applying print.

In accordance with one important aspect of the invention, the overall length of the slider is relatively short as compared with the length of the stator so that substantially all of the mass of the slider is effective in generating a force on the slider so as to achieve high performance. In addition, the slider comprises non-magnetic discontinuities including non-magnetic material so as to eliminate any substantial longitudinal flux leakage. The non-magnetic discontinuities may decrease the flux leakage to less than 25% of the flux through the flux path and preferably less than 10%. These magnetic discontinuities provide for a minimum thickness of magnetic material in the slider at the discontinuities which is less than 25% of the maximum thickness of the slider means with less than 15% preferred.

In accordance with another important aspect of the invention, the stator means comprises an active portion having windings associated there with on one side of the air gap and a passive portion having no winding associated therewith on the other side of the air gap. The means for applying print is located adjacent the passive portion of the stator means. Preferably, the means for applying print comprises an impact printing wheel having character elements circumferentially spaced thereabout. The wheel includes a portion which extends alongside the passive portion of the stator means where that portion is closer to the air gap than at least a portion of the active portion of the stator means.

In the preferred embodiment of the invention, the means for supporting the print receiving medium comprises a substantially cylindrical surface. Both the active portion and the passive portion of the stator means are positioned below and extend substantially parallel with the axis of the cylindrical surface and the means for applying print is mounted on and above the slider means. The means for applying print may further comprise a rotary motor mounted on the slider and coupled to the print wheel where the axis of the motor is spaced from the uppermost surface of the passive portion at said wheel a substantially lesser distance than the radius of the wheel.

A preferred embodiment of the invention also comprises bearing means which engage the stator means for supporting and guiding the means for applying print. The bearing means may comprise rollers which engage the active portion as well as the passive portion where the surface engaged on the passive portion is substantially closer to the air gap than the surface engaged on the active portion. Preferably, one of the rollers engages a surface of the passive portion which faces away from the air gap and a portion of the print wheel is juxtaposed to that surface.

BRIEF DESCRIPTION OF THE DRAWINGS

FIG. 4 is a bottom plan view of the drive mechanism in FIG. 1;

FIG. 5 is a view taken along line 5—5 of FIG. 3;

DETAILED DESCRIPTION OF A PREFERRED EMBODIMENT

Figure 1:
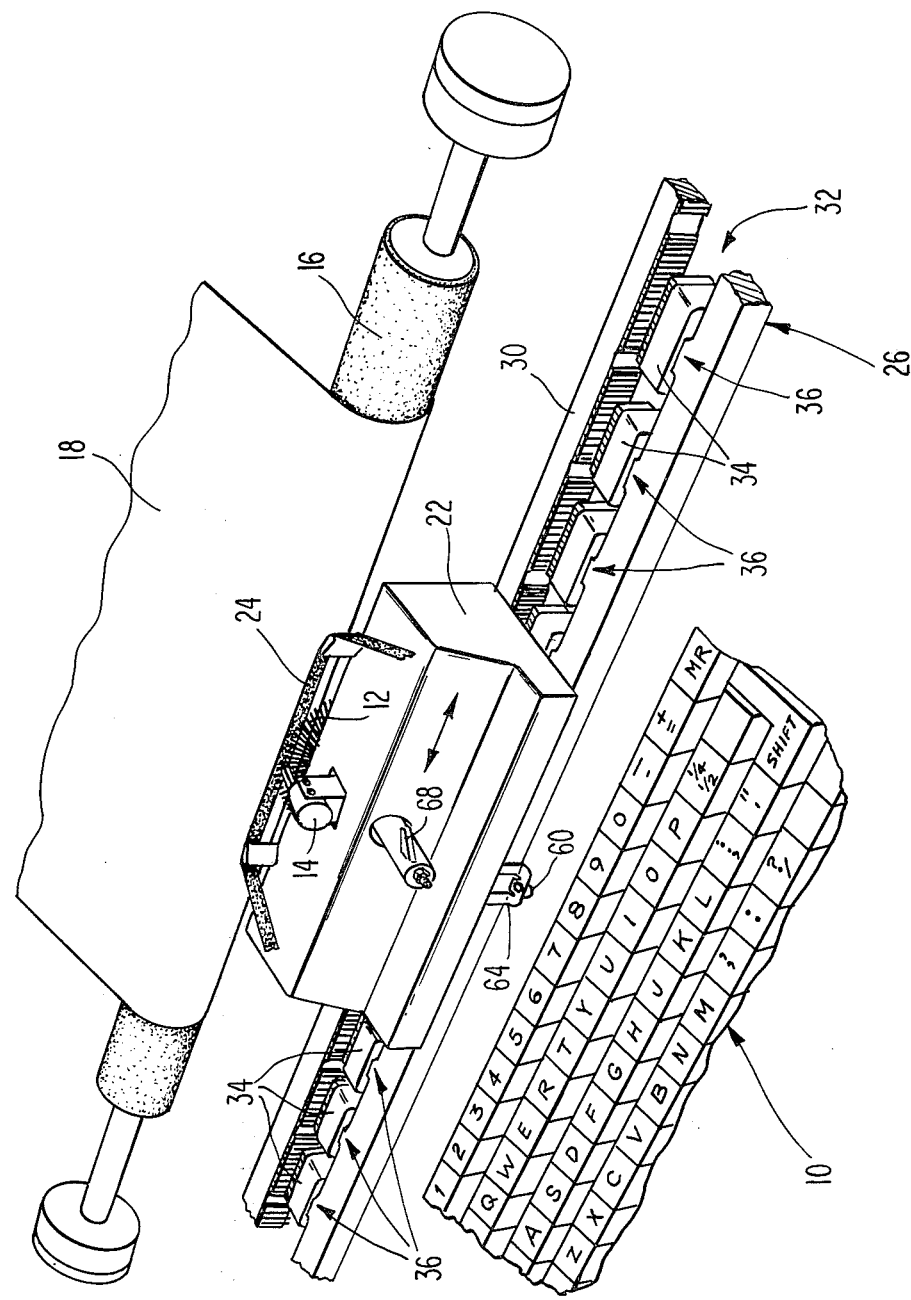
FIG. 1 is a perspective view of a printing apparatus in the form of a typewriter which embodies the invention.

A high speed serial impact printing apparatus in the form of a typewriter, as shown in FIG. 1, comprises a keyboard 10 which includes a multiplicity of keys corresponding to various characters which, upon depression, control the position of a rotatable character array in the form of a print wheel 12. The wheel 12 in combination with the hammer 14, applies print to a print receiving medium in the form of paper 18 which is supported by a platen 16. The platen 16 which comprises a cylindrical surface supports the paper 18 so as to permit contacting of the paper 18 by a marking medium in the form of an ink ribbon 20 which is located between the print wheel 12 and the paper 18 so as to leave a mark in ink corresponding to the particular character of the wheel 12 which is in position between the hammer 14 and the paper 18.

As shown in FIG. 1, the print wheel 12 and the hammer 14 are mounted on a carriage 22 which is adapted to move in the direction parallel with the axis of the platen 16 so as to position the print wheel 12 at various positions along the paper 18 in response to the depression of keys on the keyboard 10. As the carriage 22 is moved, the print wheel 12 rotates so as to position the proper character element which is located at the end of radially extending spokes 24 in the printing position aligned with the print hammer 14.

In accordance with this invention, the carriage 22 for the print wheel 12 is coupled to and driven by a passive slider of a high performance linear stepper motor 26. As shown in FIG. 1, the stepper motor 26 includes a stator having an active portion 28 and a passive portion 30 so as to define a stator-to-stator air gap 32. The active portion 28 of the stator is energized by windings 34 located at each of the pole positions 35 which extend along the length of the motor 26.

Figure 2:
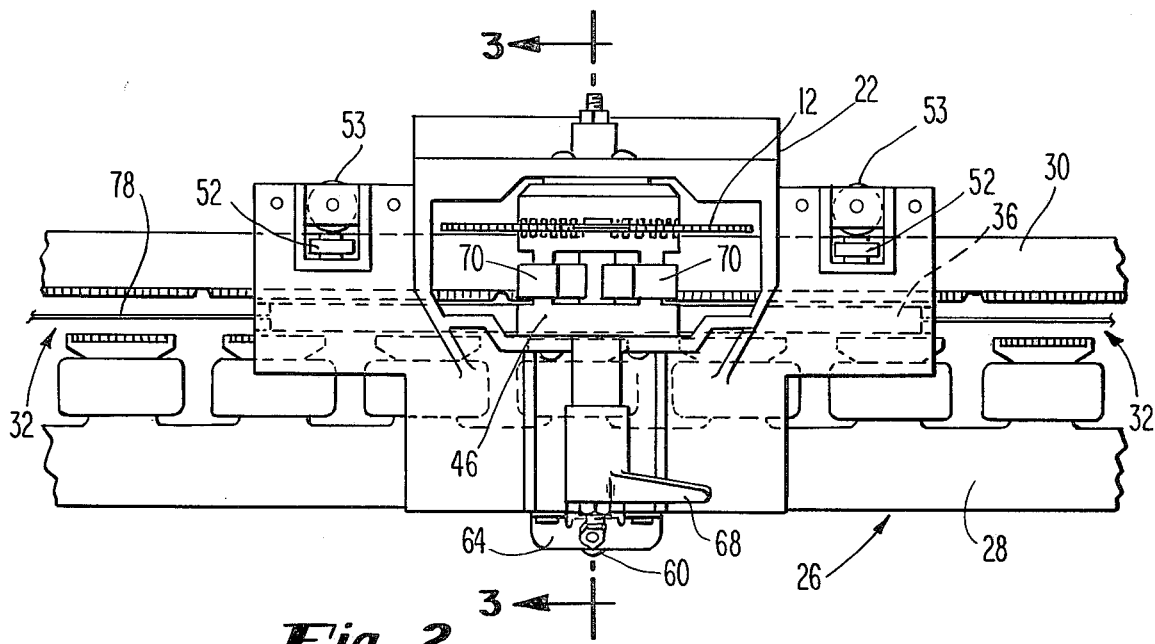
FIG. 2 is a top plan view of the drive mechanism of the typewriter of FIG. 1 with the cover cut away.
Figure 3:
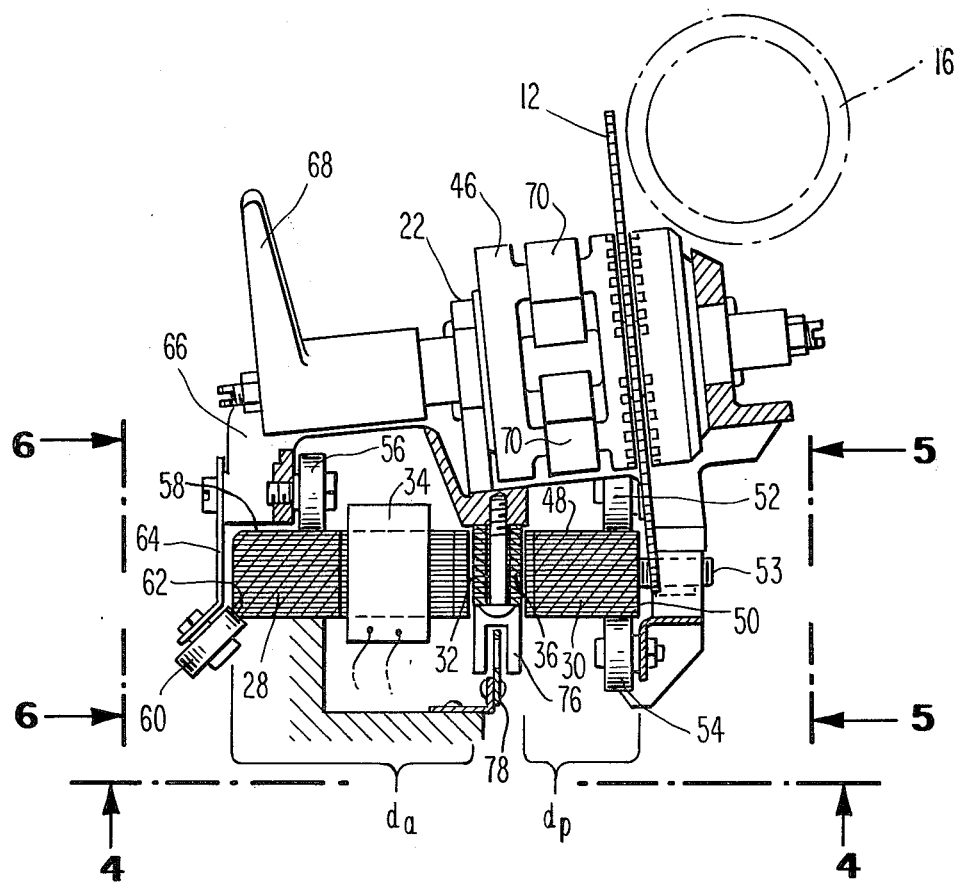
FIG. 3 is a sectional view taken along line 3—3 of FIG. 2.

Referring now to FIGS. 2 and 3, a slider 36 is mounted in the air gap 32 so as to close the transverse flux paths between the active portion 28 and the passive portion 30 of the stator. As shown in FIG. 2 and better illustrated in FIG. 4, the slider 36 is relatively short as compared with the overall length of the stator so as to assure high performance of the linear stepper motor by producing force along substantially the entire length of the slider 36. In further accordance with the object of achieving high performance as a result of a high force-to-mass ratio, the slider 36 as shown in FIG. 4 includes a plurality of non-magnetic discontinuities which will now be more fully described with reference to FIG. 7.

Figure 7:
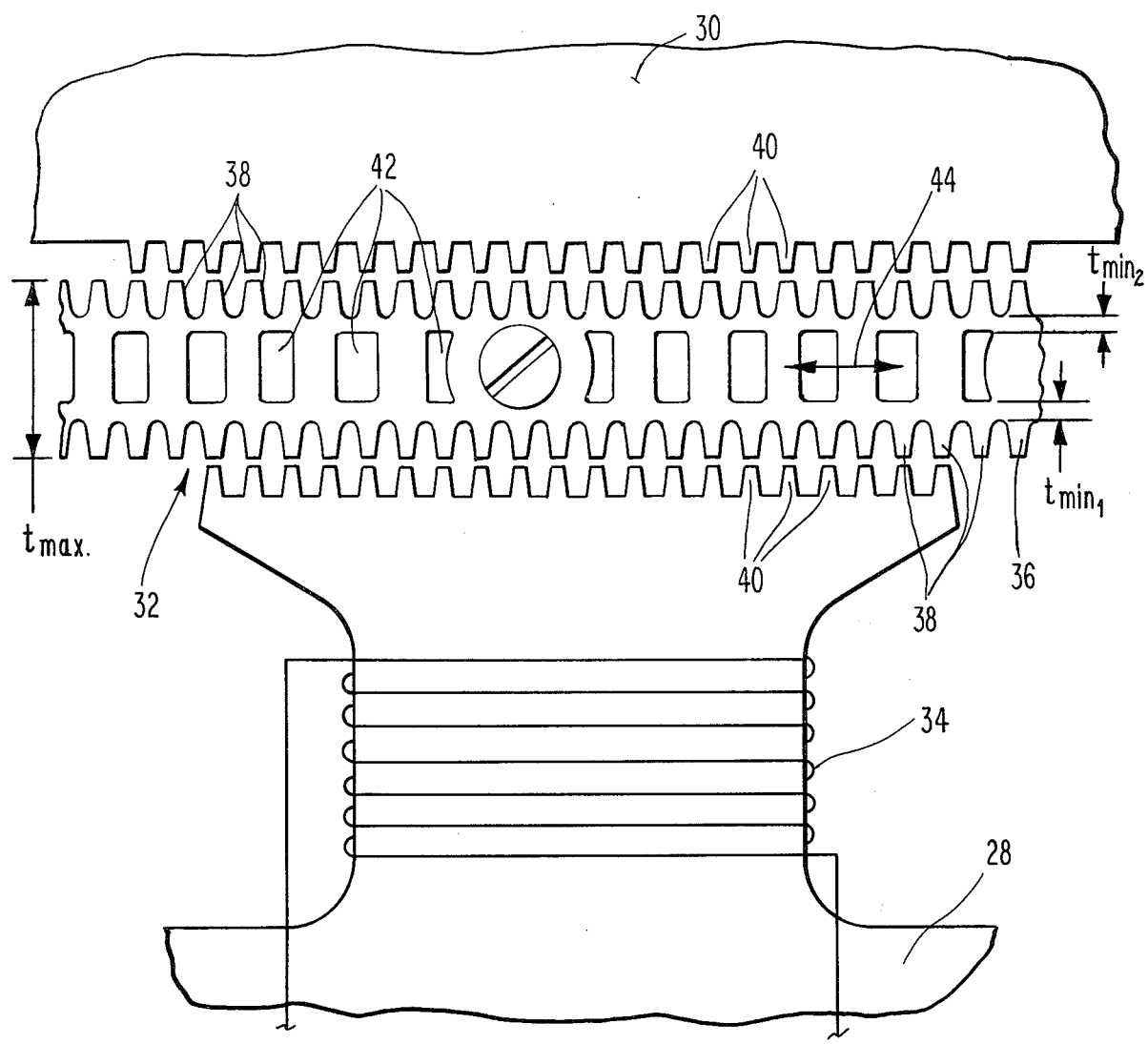
FIG. 7 is an enlarged view of one pole position of the stepper motor shown in FIGS. 1-6.

As shown in FIG. 7, the slider 36 comprises a plurality of passive magnetic motive elements or teeth 38 along the entire length of the slider 36. The teeth 38 cooperate with the stator elements or teeth 40 of the active portion 28 as well as the passive portion 30 so as to close transverse magnetic flux paths across the gap 32. In order to substantially eliminate or at least greatly curtail longitudinal flux leakage through the slider 36 while at the same time reducing the overall mass of the slider 36 and thereby increase the force-to-mass ratio of the slider, additional non-magnetic discontinuities 42 are located along the length of the slider 36. This curtailment of longitudinal flux leakage is particularly important where the stator is energized on only one side of the air gap 32 by winding means 34 associated with the active portion 28 of the stator. Not only is the force-to-mass ratio maximized, but the absence of longitudinal flux leakage means that the forces applied to the slider 36 at each side of the air gap are balanced so as to eliminate undesirable attractive forces between the slider 36 and the stator.

As described in detail in copending application Ser. No. 809,646 filed June 24, 1977 which is incorporated herein by reference, the force-to-mass ratio is maximized by assuring that the discontinuities decrease the longitudinal flux leakage in a direction indicated by arrows 44 to less than 25% of the flux through the flux paths transverse or across the air gap 32. Preferably, the discontinuities decrease the flux leakage to less than 10% of the flux through the flux paths. This decrease in flux leakage is achieved by assuring that the minimum thickness of the magnetic material at the discontinuities, i.e., $t_{min1} + t_{min2}$ is less than 25% of the maximum thickness, i.e., $t_{max}$, of the slider 36 and preferably less than 15%.

As stated in the foregoing, minimizing longitudinal flux leakage through the slider 36 is particularly important where the stator is energized on only one side of the air gap. If longitudinal flux leakage were permitted, the force-to-mass ratio would be drastically reduced. Accordingly, it will be understood that the configuration of the slider in the linear stepper motor permits the use of a stepper motor which is energized on only one side of the stator in a high performance serial impact printer. Further advantages of utilizing such a linear stepper motor will now be explained with further reference to FIGS. 2 and 3.

As best shown in FIG. 3, the use of winding means 34 on only one side of the stator-to-stator air gap 32 allows the print wheel 12 and its associated drive mechanism in the form of a rotary stepper motor 46 to be mounted with a low center of gravity. In this connection, it will be noted that the print wheel 12 actually extends down below the uppermost surface 48 of the stator passive portion 30 so as to be juxtaposed to a surface 50 which faces away from the air gap 32. It will of course be also appreciated that the presence of windings on the passive portion 30 so as to convert it to an active stator portion would preclude this position of the print wheel 12 since the portion of the print wheel 12 which extends below the surface 48 would be interfered with by the increased size of the stator structure at that location. In this regard, it will be noted that the portion of the print wheel 12 which does extend below the surface 48 and is juxtaposed to the surface 50 is substantially closer to the air gap 32 than a substantial portion of the active stator portion 28 because the dimension $d_p$ of the passive portion as measured to the air gap is substantially less than the dimension $d_a$ as measured to the air gap.

As also shown in FIG. 3, the carriage 22 for the print wheel 12 and the motor 46 is actually supported on and guided by the stator by means of a plurality of roller bearings. As shown in FIGS. 3 and 4, a pair of bearings 52 engage the surface 48 and a pair of bearings 53 engage on either side of the wheel 12. Another bearing 54 engages the underside of the stator portion 30.

Figure 6:
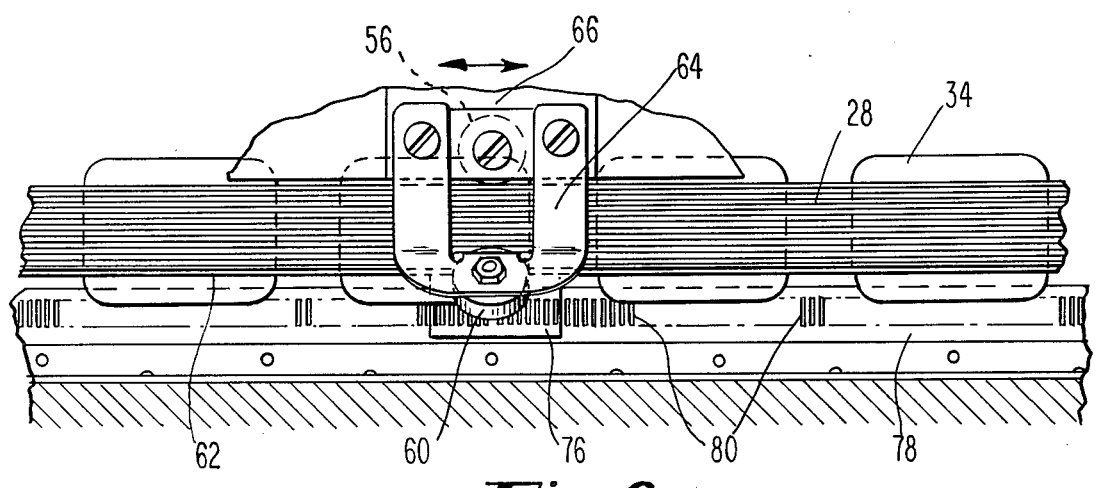
FIG. 6 is a view taken along line 6—6 of FIG. 3.

Similar roller bearings engage the active portion 28 of the stator as best shown in FIGS. 3, 4 and 6. More particularly, a bearing 56 bears on the upper surface 58 of the active portion 28. Another bearing 60 is inclined so as to bear upon a 45° chamfer 62 along the lower edge of the active portion 28 of the stator. The bearing 60 is mounted on a spring arm 64 which maintains the roller 60 biased against the chamfered surface 62 of the active portion 28. The relationship between the roller 60 and the surface 62 is perhaps best shown in FIG. 4. As shown in FIGS. 3 and 6, the spring arm 64 is bolted to a frame 66 of the carriage 22. The other bearings 52, 53, 54, 56 and 60 are also fastened to the frame 66 of the carriage 22. The frame 66 is then bolted directly to the slider 36 as shown in FIG. 3. It will be noted that the bearings engaging the active portion 28 are spaced a greater distance from the air gap than the bearings engaging with the passive portion 30 to avoid interference with the windings.

With respect to the rotary motor 46 and a lever 68 which is utilized to release the print wheel 12, reference is made to copending application Ser. No. 809,923 filed June 24, 1977 which is incorporated herein by reference. As disclosed and described in detail therein, the rotary motor 46 comprises a stepper motor which also includes windings 70 which are associated with only one side of the stator. As a consequence, a portion of the wheel 12 which extends upwardly is easily placed in printing relationship with the print receiving medium or paper carried by the platen 16. It will be noted that the print wheel 12 forms a slight angle with respect to the vertical so as to assure that the character elements 72 as shown in FIG. 5 which are attached at the ends of spokes 24 of the print wheel 12 will be radially inwardly directed at the axis of the platen 16 upon being struck by the hammer 14.

As shown in FIGS. 2, 3 and 6, the slider 36 also carries position sensing means which communicates with position indicating means mounted in a stationary position with respect to the stator of the motor 26. In particular, the slider 36 comprises a bifurcated optical sensing mechanism 76 having a light emitting means in one leg and light detecting means in the other leg. The bifurcated sensing mechanism straddles a ribbon 78 comprising a plurality of openings 80 which pass light from the light emitting means to the light detecting means of the position sensing mechanism 76. By counting the number of openings 80 which are sensed, the position sensing mechanism 76 is able to determine the position of the carriage 22 with respect to the stator of the motor 26 and the paper 18 as shown in FIG. 1. The ribbon 78 may be secured by bolting the ribbon to a frame on which the stator of the motor 26 is mounted.

For further details relating to the nature of the linear stepper motor, reference is made to the aforesaid copending application Ser. No. 809,646 filed June 24, 1977. For example, one particular mode of energizing the winding 34 so as to advance the slider 36 $\frac{1}{8}$ of the pitch between the teeth 40 so as to achieve precise alignment between the teeth 38 and the teeth 40 every other phase of energization is described therein. Of course, it will be understood that various modes of winding energization may be utilized including changes in the number of phases. Moreover, the number of teeth 38 and 40 may be varied although a relatively large number of teeth per pole position as shown in FIG. 7 is desirable to provide the desired high force-to-mass ratio.

For various details of linear or rotary stepper motors which have not been set forth herein or in the referenced copending applications, reference is made to "Theory and Application of Step Motors," edited by Benjamin Kuo, West Publishing Co., 1974. This publication will, for example, describe in detail the structure and principles of stepper motors of the rotary and linear type.

As used herein, the phrase stepper motor embraces variable reluctance motors which, because of their magnetic structure, are capable of operating in a mode which produces movement in discrete steps. However, the phrase is also intended to cover motors of this type which are operated in a mode producing continuous positioning.

Although specific embodiments of the invention have been shown and described, it will be understood that other embodiments and modifications which will occur to those of ordinary skill in the art fall within the true spirit and scope of the invention as set forth in the appended claims.

What is claimed is:

1. Apparatus for printing on a print receiving medium comprising:
   printing means including
     means for supporting the print receiving medium, and
     means for applying print to the print receiving medium; and
   drive means for creating relative movement between the means for supporting and the means for applying, said drive means comprising a linear stepper motor including
     stator means comprising an active portion and a passive portion forming a plurality of pole positions, each of said pole positions including a plurality of magnetic stator elements on opposite sides of an air gap with non-magnetic material located in the spaces between the extremities of said magnetic stator element on each of said opposite sides of said air gap,
     winding means associated only with said active portion of said stator means for generating magnetic flux paths transverse to the air gap when said winding means are energized, and
     slider means located in said air gap for moving through said air gap in response to mangetic flux paths, said slider means being coupled to said printing means for producing said relative movement.

2. The apparatus of claim 1 wherein said slider is short relative to the length of said stator means.

3. The apparatus of claim 2 wherein said slider comprises magnetic material having discontinuities such that the longitudinal flux leakage through said slider in a direction parallel to the movement of the slider is less than 25% of the transverse flux in a direction perpendicular to the movement of the slider.

4. The apparatus of claim 2 wherein the slider comprises magnetic materials having discontinuities such that the minimum thickness of magnetic material in said slider at said discontinuities is less than 25% of the maximum thickness of the slider.

5. The apparatus of claim 1 wherein said slider comprises magnetic material having discontinuities such that the longitudinal flux leakage through said slider in a direction parallel to the movement of the slider is less than 25% of the transverse flux in a direction perpendicular to the movement of the slider.

6. The apparatus of claim 5 wherein the longitudinal flux leakage is less than 10% of the flux through the flux paths.

7. The apparatus of claim 1 wherein the slider comprises magnetic materials having discontinuities such that the minimum thickness of magnetic material in said slider at said discontinuities is less than 25% of the maximum thickness of the slider.

8. The apparatus of claim 7 wherein the minimum thickness of magnetic material in said slider at said discontinuities is less than 15% of the maximum thickness of said slider.

9. The apparatus of claim 1 wherein the means for applying print is located adjacent said passive portion of said stator means.

10. The apparatus of claim 9 wherein said means for applying print comprises a printing wheel having character elements circumferentially spaced thereabout including a portion extending alongside said passive portion of said stator means.

11. The apparatus of claim 10 wherein the dimension of said passive portion from said portion of said wheel to said air gap is less than the dimension of said active portion from said air gap to the extremity of said active portion most remote from said air gap.

12. The apparatus of claim 1 wherein
   said means for supporting said print receiving medium comprises a substantially cylindrical surface;
   said active portion of said stator means is positioned below and extends substantially parallel with the axis of said cylindrical surface,
   said passive portion of said stator means is also positioned below and extends substantially parallel with the axis of said cylindrical surface, and
   said means for applying print is mounted on and above said slider means.

13. The apparatus of claim 12 wherein said means for applying print comprises an impact printing wheel having character elements circumferentially spaced thereabout, a portion of said print wheel extending below the upper surface of said passive portion.

14. The apparatus of claim 13 wherein said means for applying print further comprises a rotary motor mounted on said slider and coupled to said wheel, said motor having an axis spaced from the uppermost surface of said passive portion at said wheel a substantially lesser distance than the radius of said wheel.

15. The apparatus of claim 14 wherein the minimum distance between the axis of the cylindrical surface and the axis of the rotary motor is substantially less than the radius of said wheel.

16. The apparatus of claim 12 including bearing means engaging said stator means for supporting and guiding said means for applying print.

17. The apparatus of claim 16 wherein said bearing means engage said passive portion of said stator means.

18. The apparatus of claim 17 wherein said bearing means are positioned above and below said passive portion.

19. The apparatus of claim 17 wherein said bearing means also engage said active portion, said bearing means engaging said active portion a greater distance from said air gap than said bearing means engages said passive portion so as to avoid interference with said winding means.

20. The apparatus of claim 19 wherein said bearing means engages said passive portion and said active portion, said bearing means engaging a surface of said passive portion facing substantially away from said air gap.

21. The apparatus of claim 20 wherein said means for applying print comprises an impact printing wheel having character elements circumferentially spaced thereabout, a portion of said wheel being substantially juxtaposed to said surface facing substantially away from said air gap.

22. The apparatus of claim 21 wherein said bearing means engage said surface facing substantially away from said air gap, said portion of said wheel extending between areas of engagement by said bearing means.

23. The apparatus of claim 1 wherein said means for applying print further comprises a rotary stepper motor and an impact printing wheel having character elements circumferentially spaced thereabout.

24. Apparatus for printing on a print receiving medium comprising:

printing means including
  means for supporting a print receiving medium, and
  means for applying print to said print receiving medium; and
drive means for creating relative movement between said printing means and said print receiving medium, said drive means comprising a linear stepper motor including
  stator means including a plurality of pole positions having a plurality of magnetic stator elements on opposite sides of an air gap at each of the pole positions with non-magnetic material located in the spaces between the extremities of the magnetic stator elements on each of the opposite sides of the air gap,
  winding means associated with said stator means for generating magnetic flux paths transverse to the air gap when the winding means are energized, and
  slider means located in said air gap for moving through said air gap in response to the magnetic flux paths, said slider means being relatively short as compared with the stator means, said slider means being coupled to the printing means for producing relative movement between the means for applying print and the means for supporting the print receiving medium.

* * * * *